United States Patent
Huet et al.

(10) Patent No.: US 10,407,827 B2
(45) Date of Patent: Sep. 10, 2019

(54) DEVICE AND METHOD FOR TREATING THE BLACK LIQUOR RESULTING FROM PULPING BY HYDROTHERMAL LIQUEFACTION

(71) Applicant: COMMISSARIAT A L'ENERGIE ATOMIQUE ET AUX ENERGIES ALTERNATIVES, Paris (FR)

(72) Inventors: Marion Huet, Saint Alban Leysse (FR); Dominique Lachenal, Echirolles (FR); Anne Roubaud, Chabons (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 344 days.

(21) Appl. No.: 15/222,287

(22) Filed: Jul. 28, 2016

(65) Prior Publication Data

US 2017/0030017 A1    Feb. 2, 2017

(30) Foreign Application Priority Data

Jul. 31, 2015 (FR) ...................... 15 57351

(51) Int. Cl.
| | |
|---|---|
| *D21C 11/00* | (2006.01) |
| *D21C 11/12* | (2006.01) |
| *D21C 11/10* | (2006.01) |
| *D21C 7/00* | (2006.01) |

(52) U.S. Cl.
CPC ............ *D21C 11/0007* (2013.01); *D21C 7/00* (2013.01); *D21C 11/00* (2013.01); *D21C 11/0042* (2013.01); *D21C 11/10* (2013.01); *D21C 11/125* (2013.01); *Y02P 30/20* (2015.11)

(58) Field of Classification Search
CPC ...... D21C 11/00; D21C 11/125; D21C 11/007
See application file for complete search history.

(56) References Cited

U.S. PATENT DOCUMENTS 2,399,607 A    4/1946    Servis

FOREIGN PATENT DOCUMENTS

| EP | 025133 A1 | 3/1981 | |
| WO | WO-8001490 A1 * | 7/1980 | ......... D21C 11/0042 |
| WO | WO-9105103 A2 | 4/1991 | |
| WO | WO-2006037860 A1 | 4/2006 | |
| WO | WO-2012091906 A2 | 7/2012 | |

OTHER PUBLICATIONS

Elliott et al., Hydrothermal liquefaction of biomass:Develeopments from batch to continuous process, 2015, Bioresource Technology, 178, p. 147-156.*
Search Report and Written Opinion for Application FR 1557351, dated Apr. 11, 2016.
M. Uematsu, et al., Static Dielectric Constant of Water and Steam, J. Phys. Chem. Ref. Data, vol. 9, No. 4, 1980.

* cited by examiner

*Primary Examiner* — Anthony Calandra
(74) *Attorney, Agent, or Firm* — Marshall, Gerstein & Borun LLP

(57) ABSTRACT

The present invention relates to a paper pulp preparation device comprising a wood component cooking unit and a hydrothermal liquefaction unit.
The invention also relates to the use of such a device in a method of treating the black liquor resulting from pulping and a method of preparing paper pulp from wood.

8 Claims, 2 Drawing Sheets

DEVICE AND METHOD FOR TREATING THE BLACK LIQUOR RESULTING FROM PULPING BY HYDROTHERMAL LIQUEFACTION

CROSS-REFERENCE TO RELATED APPLICATIONS

This application claims the benefit of priority under 35 U.S.C. § 119 of prior-filed French Patent Application No. 1557351, filed Jul. 31, 2015, the entire content of which is hereby incorporated herein by reference, in its entirety and for all purposes.

DOMAIN OF THE INVENTION

The present invention relates to a device and a method enabling to treat the black liquor resulting from pulping. The treatment of black liquor is performed by hydrothermal liquefaction.

The field of use of the invention particularly relates to the paper industry.

BACKGROUND

Generally, the preparation of the paper pulp comprises separating the elements forming wood, and more particularly isolating cellulose fibers from the other components (mainly wood lignin).

It may be an alkaline wood processing method, for example, by cooking in the presence of a solution called "white liquor". White liquor is generally formed of water, of soda, and possibly of a source of sulfur such as sodium sulfide. The alkaline processing of wood is generally performed at a temperature in the range from 150 to 180° C., and at a pressure in the range from 7 to 9 bars. This is in particular true for the preparation of Kraft-type paper pulp.

At the end of the processing, the cellulose-rich fibers form the paper pulp, while the cooking residues form an aqueous phase called "black liquor". Black liquor contains a large part of the wood lignin, possibly in a degraded state, part of the hemicelluloses, but also of the degraded cellulose and of the derivatives of the cooking reactants present in the white liquor (sodium carbonate . . . ).

Typically, the black liquor is recycled by being concentrated and then burnt in a Tomlinson-type boiler. The combustion of the black liquor generates heat and vapor which may be used in the pulping process.

In an alkaline method, the black liquor combustion residues are generally treated to recover the nitrogen as well as the sulfur originating from the reactants initially present in the white liquor.

This type of alkaline method has many disadvantages, among which:

the cost of installing and maintaining the boiler allowing the combustion of the black liquor;

the low energy efficiency of the black liquor combustion (less than 40%); and the impossibility of unclogging the black liquor boiler to increase the pulping yield.

It is possible to extract the hemicelluloses prior to the cooking of the wood. Such a pre-processing is particularly advantageous, given that hemicelluloses may be a source of sugars, or oligomers, or of polymers usable in the manufacturing of bio-products (surface-active agents . . . ), of bio-fuel (ethanol . . . ), or of biomaterials.

On the other hand, the prior extraction of hemicelluloses makes the pulping easier, since it enables to get rid of the presence of sulfur.

Other black liquor usage methods have been studied, for example, to chemically use the lignin of the black liquor. Document U.S. Pat. No. 2,399,607 describes the forming of vanillin by wet oxidation (WO) of the black liquor.

Document EP 0 251 533 describes the wet oxidation of a portion only of the black liquor prior to the steps of evaporation and combustion in the boiler. In this method, the organic material of the treated black liquor portion is destroyed by more than 90%. The oxidized black liquor is then mixed with the remaining black liquor to be treated according to the conventional method (concentration+combustion). The organic load of the black liquor is thus decreased, which enables to unclog the black liquor combustion boiler.

However, such solutions are not fully satisfactory.

The present invention enables to combine the utilization of organic compounds contained in the black liquor and the unclogging of the black liquor combustion boiler and this, without impacting the regeneration of wood cooking reactants, that is, soda in the alkaline method.

SUMMARY OF THE SPECIFICATION

The Applicant has developed a device and a method enabling, in a pulp mill, to:

chemically and energetically utilize the organic compounds contained in the black liquor;

unclog the boiler conventionally used to burn the black liquor;

recycle the water used in pulping;

regenerate the sodium resulting from the alkaline wood cooking process.

Such advantages are obtained due to the integration of a hydrothermal liquefaction unit in a conventional black liquor recovery installation within a paper mill.

More specifically, the present invention relates to a paper pulp preparation device comprising:

a unit for cooking the wood components, comprising a first inlet $E_{1a}$, a second inlet $E_{1b}$, a first outlet $S_{1a}$ and a second outlet $S_{1b}$;

a hydrothermal liquefaction unit comprising:
an inlet $E_2$ connected to second outlet $S_{1b}$ of the cooking unit;
a first outlet $S_{12a}$;
a second outlet $S_{12b}$;

a connection line $C_2$ between outlet $S_{1b}$ and inlet $E_{12}$;

a separation unit downstream of outlet $S_{12b}$ of the hydrothermal liquefaction unit, comprising:
an inlet $E_{17}$ connected to outlet $S_{12b}$ of the hydrothermal liquefaction unit;
a first outlet $S_{17a}$;
a second outlet $S_{17b}$;

a connection line $C_{12-17}$ between outlet $S_{12b}$ and inlet $E_{17}$.

In fact, the present invention relates to a paper pulp preparation device comprising:

a unit for cooking the wood components, in which the wood components are separated into two fractions:
paper pulp, and
black liquor;

the unit for cooking the wood comprising a first inlet $E_{1a}$ for introducing wood, a second inlet $E_{1b}$ for discharging while liquor, a first outlet $S_{1a}$ for discharging the paper pulp, and a second outlet $S_{1b}$ for discharging the black liquor;

a hydrothermal liquefaction unit allowing the treatment of at least a part of the black liquor, and comprising:
  an inlet $E_{12}$ for the black liquor connected to second outlet $S_{1b}$ of the cooking unit;
  a first outlet $S_{12a}$ for an organic phase resulting from the hydrothermal liquefaction;
  a second outlet $S_{12b}$ for an aqueous phase resulting from the hydrothermal liquefaction and containing organic molecules;
a connection line $C_{1-12}$ between outlet $S_{1b}$ and inlet $E_{12}$;
a separation unit downstream of outlet $S_{12b}$ of the hydrothermal liquefaction unit, the separation unit allowing the separation of organic molecules contained in the aqueous phase resulting from the hydrothermal liquefaction, and comprising:
  an inlet $E_{17}$ for the aqueous phase resulting from the hydrothermal liquefaction, connected to outlet $S_{12b}$ of the hydrothermal liquefaction unit;
  a first outlet $S_{17a}$ of organic molecules;
  a second outlet $S_{17b}$ of aqueous phase;
    a connection line $C_{12-17}$ between outlet $S_{12b}$ and inlet $E_{17}$.

The connection line $C_{1-12}$ between outlet $S_{1b}$ and inlet $E_{12}$ allows directing at least part of the black liquor resulting from the cooking unit to the hydrothermal liquefaction unit.

The connection line $C_{12-17}$ between outlet $S_{12b}$ and inlet $E_{17}$ allows directing the aqueous phase containing organic molecules, which is issued from the hydrothermal liquefaction of the black liquor, to the separation unit.

According to a specific embodiment of the invention, the device comprises:
  a unit for cooking the wood components, comprising a first inlet $E_{1a}$, a second inlet $E_{1b}$, a first outlet $S_{1a}$, and a second outlet $S_{1b}$;
  an evaporation unit downstream of outlet $S_{1b}$ of the cooking unit, comprising an inlet $E_5$ and an outlet $S_5$;
  a connection line $C_{1-5}$ between outlet $S_{1b}$ and inlet $E_5$;
  a boiler, particularly of Tomlinson type, downstream of outlet $S_5$ of the evaporation unit, comprising an inlet $E_6$ and an outlet $S_6$;
  a connection line $C_{5-6}$ between outlet $S_5$ and inlet $E_6$;
  a causticizing unit downstream of outlet $S_6$ of the boiler, comprising an inlet $E_9$ and an outlet $S_9$, outlet $S_9$ being connected to second inlet $E_{1b}$ of the cooking unit;
  a connection line $C_{6-9}$ between outlet $S_6$ and inlet $E_9$;
  a connection line $C_{9-1}$ between outlet $S_9$ and inlet $E_{1b}$;
  a hydrothermal liquefaction unit comprising:
    an inlet $E_{12}$ connected to second outlet $S_{1b}$ of the cooking unit;
    a first outlet $S_{12a}$ connected to inlet $E_6$ of the boiler;
    a second outlet $S_{12b}$;
  a connection line $C_{1-12}$ between outlet $S_{1b}$ and inlet $E_{12}$;
  a connection line $C_{12-6}$ between outlet $S_{12a}$ and inlet $E_6$;
  a separation unit downstream of outlet $S_{12b}$ of the hydrothermal liquefaction unit, comprising:
    an inlet $E_{17}$ connected to outlet $S_{12b}$ of the hydrothermal liquefaction unit;
    a first outlet $S_{17a}$;
    a second outlet $S_{17b}$ connected to inlet $E_9$ of the causticizing unit;
  a connection line $C_{12-17}$ between outlet $S_{12b}$ and inlet $E_{17}$;
  a connection line $C_{17-9}$ between outlet $S_{17b}$ and inlet $E_9$.

The evaporation unit, which is downstream from outlet $S_{1b}$ of the cooking unit, allows concentrating the black liquor. It comprises an inlet $E_5$ for the black liquor from the cooking unit and an outlet $S_5$ for the black liquor that has been concentrated.

The boiler, which is downstream of the outlet $S_5$ of the evaporation unit, allows burning the concentrated black liquor. It comprises an inlet $E_6$ for the concentrated black liquor and an outlet $S_6$ for the residues of the combustion in the boiler of the concentrated black liquor.

The causticizing unit, which is downstream of outlet $S_6$ of the boiler, comprises an inlet $E_9$ for a green liquor containing residues of the combustion in the boiler of the concentrated black liquor. It also comprises an outlet $S_9$ for a white liquor, the outlet $S_9$ being connected to the second inlet $E_{1b}$ of the cooking unit.

The connection line $C_{1-5}$ between outlet $S_{1b}$ and inlet $E_5$ allows directing a part of the black liquor from the cooking unit (but not directed the hydrothermal liquefaction unit) to the evaporation unit.

The connection line $C_{5-6}$ between outlet $S_5$ and inlet $E_6$ allows directing the concentrated black liquor from the evaporation unit to the boiler.

The connection line $C_{6-9}$ between outlet $S_6$ and inlet $E_9$ allows directing the residues of the combustion in the boiler to the causticizing unit, eventually to form a green liquor.

The connection line $C_{9-1}$ between outlet $S_9$ and inlet $E_{1b}$ allows directing the white liquor from the causticizing unit to the cooking unit.

The connection line $C_{12-6}$ between outlet $S_{12a}$ and inlet $E_6$ allows directing the organic phase resulting from the hydrothermal liquefaction of the black liquor to the boiler, downstream of the evaporation unit.

The connection line $C_{17-9}$ between outlet $S_{17b}$ and inlet $E_9$ allows directing the aqueous phase from the separation unit to the causticizing unit.

In the wood component cooking unit, the wood is introduced through first inlet $E_{1a}$. The wood may be prehydrolyzed or not. Second inlet $E_{1b}$ enables to introduce the white liquor, resulting from the cycle of recycling the generated black liquor.

First outlet $S_{1a}$ enables to discharge the paper pulp resulting from the wood cooking. Second outlet $S_{1b}$ enables to discharge the black liquor generated during the wood cooking.

Connection line $C_{1-12}$ may directly connect outlet $S_{1b}$ and inlet $E_{12}$. It may also connect outlet $S_{1b}$ and inlet $E_{12}$ via a bypassing of connection line $C_{1-5}$. In other words, outlet $S_{1b}$ and inlet $E_{12}$ may be directly connected via connection line $C_{1-12}$ or indirectly connected via connection lines $C_{1-12}$ and $C_{1-5}$.

Similarly, connection line $C_{12-6}$ may directly connect outlet $S_{12a}$ and inlet $E_6$. It may also connect outlet $S_{12a}$ and inlet $E_6$ via connection line $C_{5-6}$. In this case, connection line $C_{12-6}$ is connected to connection line $C_{5-6}$.

On the other hand, connection line $C_{17-9}$ may directly connect outlet $S_{17b}$ and inlet $E_9$. It may also connect outlet $S_{17b}$ and inlet $E_9$ via connection line $C_{6-9}$. In this case, connection line $C_{17-9}$ is connected to connection line $C_{6-9}$.

The device according to the invention enables to depolymerize the lignin of the black liquor by hydrothermal liquefaction. According to a specific embodiment, the hydrothermal liquefaction unit successively comprises a heat exchanger, a heating device, and an autoclave.

The present invention also relates to a method of treating the black liquor resulting from pulping. The method comprises the steps of:
  depolymerizing the black liquor by hydrothermal liquefaction;
  obtaining an aqueous phase containing organic molecules, and an organic phase;

separating the organic molecules contained in the aqueous phase.

Generally, the organic phase is viscous. Further, the black liquor corresponds to the residual liquid resulting from pulping, more particularly in an alkaline process. It generally contains:
- water;
- organic species, particularly lignin, possibly in modified form, and carbohydrates, possibly degraded;
- inorganic species, particularly sodium-based compounds resulting from the cooking of wood by an alkaline process, for example, sodium carbonates.

Black liquor generally comprises from 10 to 20% by weight of solids, advantageously from 15 to 20%.

In black liquor, the mass ratio of the organic species to the inorganic species is generally in the order of 2/1.

The black liquor used in the present invention advantageously results from an alkaline wood cooking process, particularly a cooking with soda NaOH. The black liquor advantageously contains no sulfur.

The treatment by hydrothermal liquefaction is endothermic. It enables to turn the black liquor into:
- an aqueous phase containing organic molecules;
- an organic phase called "biocrude", which may be used for energy generation; and
- gases, particularly carbon dioxide, generally amounting to less than 1% of the carbon of the black liquor.

The depolymerizing of the black liquor, by hydrothermal liquefaction, is advantageously performed at a temperature in the range from 200 to 370° C., more advantageously from 220 to 320° C., and more advantageously still from 250 to 310° C.

On the other hand, it is advantageously performed at a pressure in the range from 5 to 25 MPa, the pressure having to be greater than the saturation vapor pressure of pure water at the same temperature.

It is advantageously carried out for time period ranging from 1 minute to 4 hours, more advantageously from 15 minutes to 1 hour.

It will be within the abilities of those skilled in the art to adapt the pressure/temperature couple to ascertain that the medium stays in liquid phase and in subcritical conditions where water behaves both as a reactant and as a solvent. The dielectric constant of water decreases by 78 $F \cdot m^{-1}$ in the ambient conditions (25° C./1 bar, at 14 $F \cdot m^{-1}$ at 350° C./20 MPa (M. Uematsu and E. U. Franck, *"Static Dielectric Constant of Water and Steam"*, Journal of Physical and Chemical Reference Data, 1980, vol. 9, no 4, pages 1291-1306). Such a change of dielectric constant increases the solubility of hydrophobic organic compounds in water, and decreases that of inorganic salts.

Further, the ionic product of water is approximately 100 times higher in sub-critical conditions ($10^{-11.2}$ at 250° C./50 bar and $10^{-12}$ at 350° C./250 bar) than in ambient conditions ($10^{-14}$ at 25° C./1 bar). Hydrothermal liquefaction enables to take advantage of such properties.

The aqueous phase resulting from the hydrothermal liquefaction contains less organic matter than the black liquor. Advantageously, it comprises phenolic compounds, advantageously at least one compound selected from the group comprising phenol, guaiacol, catechol, and syringol.

It will be within the abilities of those skilled in the art to adapt the hydrothermal liquefaction treatment conditions (temperature, pressure, and duration) especially according to the result that it desires to favor (carbon balance of the aqueous phase, nature of the organic molecules of the aqueous phase), or to the composition of the black liquor (nature, concentration . . . ).

By adapting the conditions of the hydrothermal liquefaction, molecules such as guaiacol may be generated and recovered. Guaiacol is a product of the degradation of lignin, particularly of the lignin of resinous trees. It may be particularly worthy of interest, given that it is a precursor of vanillin, which compound is currently used for its flavoring properties.

As an example, a treatment by hydrothermal liquefaction at a temperature lower than 300° C. for one hour or less enables to obtain molecules of guaiacol and syringol type. However, a treatment at 310° C. for 1 hour does not provide this type of molecules, given that they are demethoxylized in such conditions. To preferably obtain guaiacol and syringol, a 250° C. temperature (5 MPa) is recommended. To preferably obtain catechol and phenol, a 280° C. temperature (8 MPa) is recommended.

The hydrothermal liquefaction (250° C./5 MPa, 1 hour) of a black liquor of prehydrolyzed resinous wood provides 2% of guaiacol, with respect to the weight of the dry black liquor. In such conditions, for an average production of 1,000 tons/day of paper pulp, that is, approximately 1,500 tons/day of dry black liquor, the production of guaiacol may reach up to 11,000 tons/year when all the black liquor is treated by hydrothermal liquefaction, and 1,100 tons/year when only 10% of the black liquor is treated by hydrothermal liquefaction.

Unlike certain prior art methods, the treatment of the black liquor by hydrothermal liquefaction according to the invention does not only result in the forming of biofuels. Indeed, when it is integrated in a paper pulp manufacturing method, it also enables to recycle the aqueous phase resulting from the hydrothermal liquefaction and, possibly, to regenerate the sodium resulting from the alkaline wood cooking treatment.

The present invention also relates to a method of preparing paper pulp from wood, comprising the treatment of at least part of the black liquor by hydrothermal liquefaction. The method comprises the following steps, carried out in a device according to the invention:
- cooking of the wood, advantageously by an alkaline method with a prehydrolysis;
- obtaining paper pulp and a black liquor;
- treating at least part of the black liquor by hydrothermal liquefaction;
- obtaining an aqueous phase containing organic molecules and an organic phase;
- optionally, injecting into a boiler the organic phase resulting from the hydrothermal liquefaction;
- treating the aqueous phase resulting from the hydrothermal liquefaction, by separation of the organic molecules;
- optionally, injecting the treated aqueous phase into a causticizing unit. This last step enables to regenerate the reactants used in the cooking of wood by an alkaline method.

As already indicated, the wood used may be prehydrolyzed or not. The wood is advantageously of prehydrolized broadleaf, non-prehydrolyzed broadleaf, and prehydrolized resinous type.

The hydrothermal liquefaction of the black liquor can be performed continuously or discontinuously. It can thus be adapted to the wood cooking method, which may be continuous or discontinuous.

Further, the quantity of black liquor treated by hydrothermal liquefaction may be adjusted, particularly according to the energy or economical needs of the paper mill, but also according to the efficiency of the step of regeneration of the wood cooking reactants by causticizing.

Typically, the black liquor proportion treated by hydrothermal liquefaction is advantageously in the range from 1 to 100%, more advantageously from 5 to 15%, by weight with respect to the weight of black liquor originating from the cooking unit.

However, and according to a specific embodiment, all the black liquor may be treated by hydrothermal liquefaction. In this case, the evaporation unit and the boiler can be suppressed from the device. A larger quantity of organic molecules can then be generated. The treatment of the aqueous phase resulting from the hydrothermal liquefaction may implement a supercritical water gasification step or an evaporation/combustion step to treat the residual organic compounds in aqueous phase.

According to another specific embodiment, the organic phase resulting from the hydrothermal liquefaction is treated to at least partly recover the organic molecules that it contains. Even though this embodiment decreases the power efficiency, it enables to increase the production of molecules of interest.

However, and advantageously, the organic phase of the hydrothermal liquefaction is upgraded by combustion in the boiler, advantageously a recovery boiler. It may also be redirected towards another boiler, for example a bark boiler which does not belong to the paper pulp preparation device.

When the black liquor originates from an alkaline method, the aqueous phase resulting from the hydrothermal liquefaction contains all the sodium initially contained in the treated black liquor.

The extraction of the organic molecules contained in the aqueous phase enables not only to utilize the black liquor, but also to decrease the organic compound concentration of the aqueous phase.

Thus, the aqueous phase coming out of the separation unit can be reintegrated into the circuit, before the causticizing step.

Generally, the causticizing step enables to regenerate the soda used in an alkaline method.

This is the treatment of residues originating from the combustion of the black liquor, and in the present case, of the aqueous phase resulting from the hydrothermal liquefaction after separation of the organic molecules. Prior to the causticizing step, the combustion residues are diluted in water. Generally, the aqueous phase resulting from the liquefaction requires no dilution prior to the causticizing.

According to another specific embodiment, the organic phase resulting from the hydrothermal liquefaction is treated to at least partly recover the organic molecules that it contains. Even though this embodiment decreases the energy efficiency, it enables to increase the production of molecules of interest.

The advantages of the present invention especially include:
the production of molecules of interest from the wood lignin contained in the black liquor while, in prior art, phenolic compounds are synthesized from petroleum;
the decrease of the quantity of organic matter introduced into the boiler, which enables to unclog the boiler, and thus to increase the production of paper pulp within a production unit limited by the capacity of its boiler;
the integration in conventional methods of a step of valorization of the black liquor by hydrothermal liquefaction, also enabling to recycle the resulting organic and aqueous phases;
the possibility of combining the hydrothermal liquefaction of the black liquor with conventional sodium recycling systems. The device according to the invention can thus be easily integrated in a paper mill.

The invention and the resulting advantages will better appear from the following non-limiting drawings and examples, provided as an illustration of the invention.

DETAILED DESCRIPTION

Figure 2:
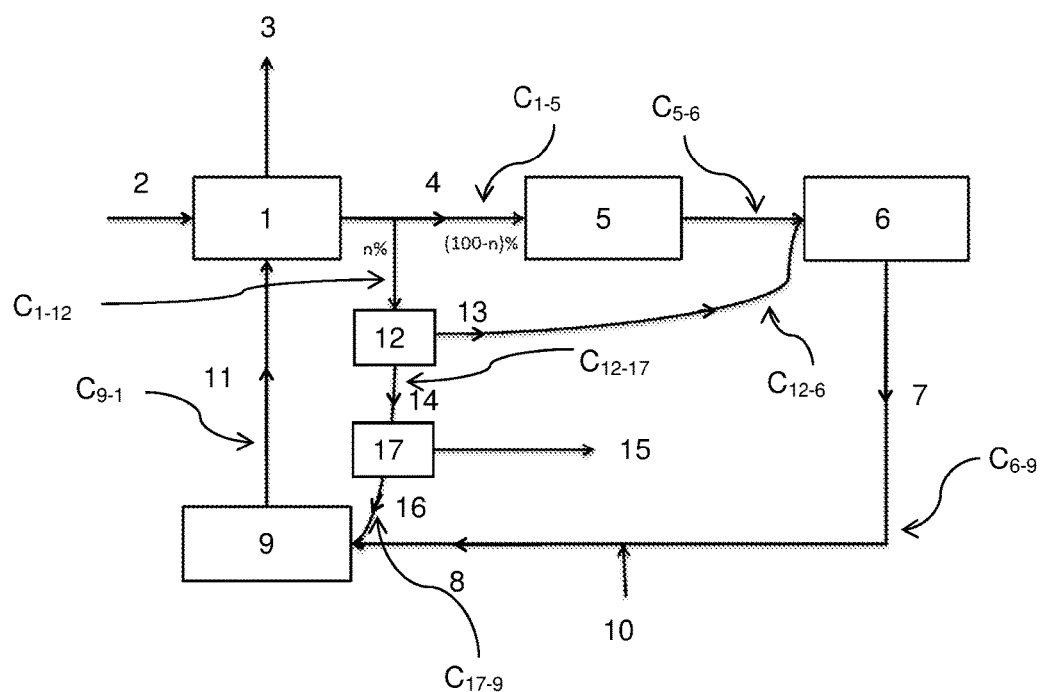
FIG. 2 illustrates a paper pulp preparation device according to a specific embodiment of the invention.
Figure 3:
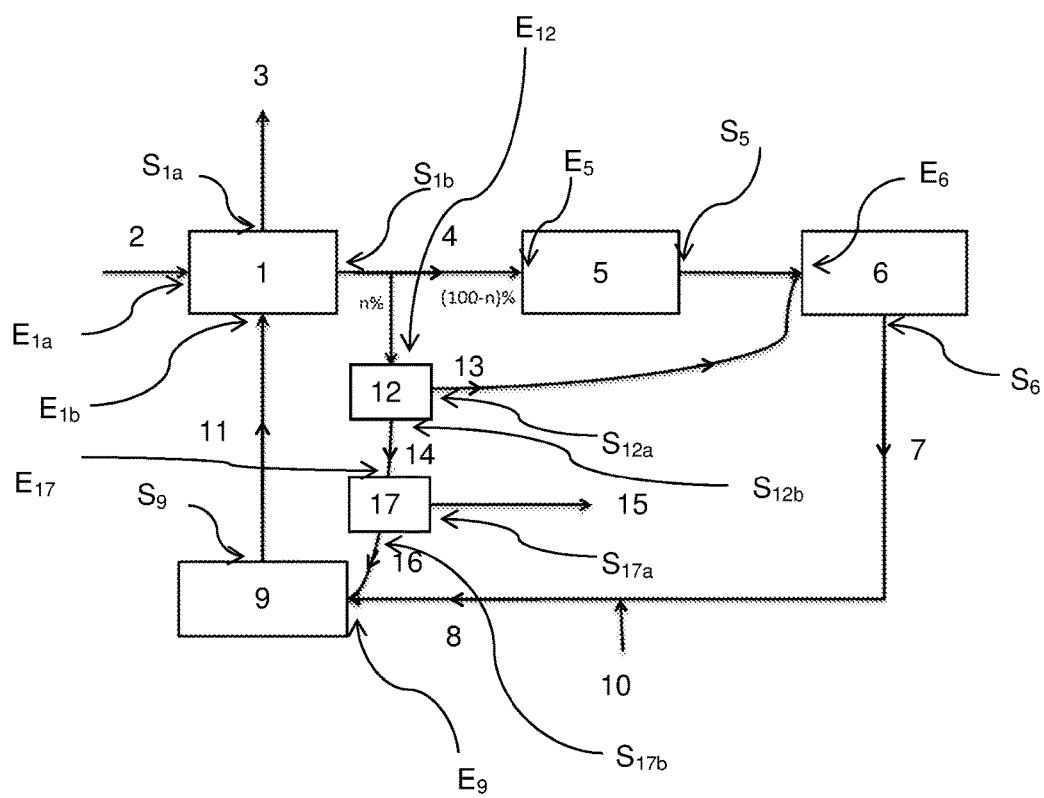
FIG. 3 illustrates a paper pulp preparation device according to a specific embodiment of the invention.

The description of the units and connections between units of the devices according to FIGS. 2 and 3 also applies to any embodiment of the invention.

Figure 1:
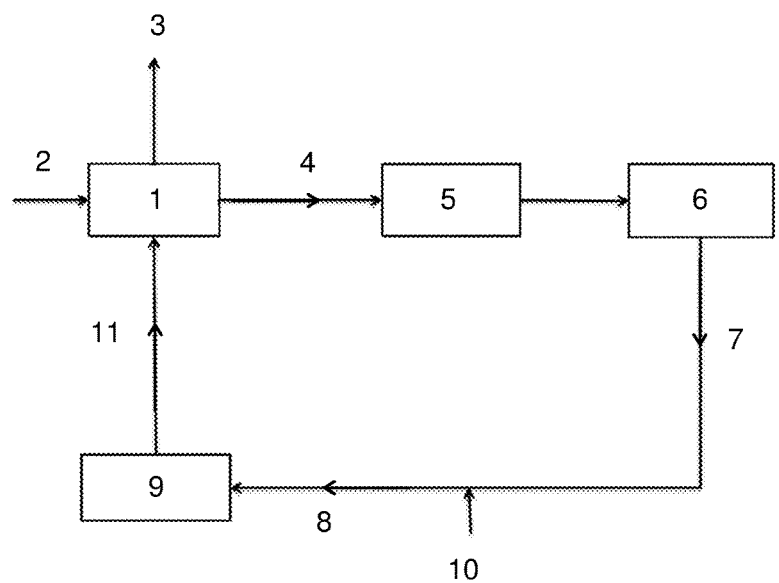
FIG. 1 illustrates a conventional paper pulp preparation device.

A conventional device (FIG. 1) enabling to prepare paper pulp generally comprises:
a cooking unit (1) where the components of the wood or of the prehydrolized wood (2) are separated into two fractions:
paper pulp (3), and
black liquor (4);
an evaporation unit (5) enabling to concentrate the black liquor (4);
a boiler (6), particularly of Tomlinson type, where the concentrated black liquor is burnt, thus providing heat and steam to the pulping process;
a unit (9) for causticizing the green liquor (8), the green liquor (8) corresponding to the residues (7) of the combustion taking place in the boiler (7), diluted in water (10). The causticizing unit (9) is connected to the combustion unit (1) to inject white liquor (11) formed by the passing of the green liquor (8) in the causticizing unit (9).

Generally, the boiler (6) advantageously is a boiler recovering the thermal energy originating from the combustion of the black liquor, called Tomlinson boiler. As already indicated, it generates steam and heat.

The combustion of the black liquor (4) in the boiler (6) generates combustion residues (7). In an alkaline method, these are molten salts originating from the cooking of the white liquor in the unit (1), particularly alkaline salts of sodium carbonate type. The solubilizing of the residues (7) in water (10) enables to form the green liquor (8).

In the causticizing unit (9), the green liquor (8) is treated to regenerate the cooking reactants in the unit (1). The regenerated reactants may be reinjected into the cooking unit (1), particularly in dissolved form, in the form of the white liquor (11). In an alkaline method, approximately 97% of the sodium initially used in the cooking unit (1) is generally regenerated.

In addition to units (1), (5), (6) and (9), the paper pulp preparation device according to the invention comprises a hydrothermal liquefaction unit (12) and a separation unit (17) (FIGS. 2 and 3).

The paper pulp preparation device according to the invention comprises:
- a unit (1) for cooking the wood components (2), comprising a first inlet $E_{1a}$, a second inlet $E_{1b}$, a first outlet $S_{1a}$, and a second outlet $S_{1b}$;
- an evaporation unit (5) downstream of outlet $S_{1b}$ of the cooking unit (1), comprising an inlet $E_5$ and an outlet $S_5$;
- a connection line $C_{1-5}$ between outlet $S_{1b}$ and inlet $E_5$;
- a boiler (6) downstream of outlet $S_5$ of the evaporation unit (5), comprising an inlet $E_6$ and an outlet $S_6$;
- a connection line $C_{5-6}$ between outlet $S_5$ and inlet $E_6$;
- a causticizing unit (9) downstream of outlet $S_6$ of the boiler (6), comprising an inlet $E_9$ and an outlet $S_9$, outlet $S_9$ being connected to second inlet $E_{1b}$ of the cooking unit (1);
- a connection line $C_{6-9}$ between outlet $S_6$ and inlet $E_9$;
- a connection line $C_{9-1}$ between outlet $S_9$ and inlet $E_{1b}$;
- a hydrothermal liquefaction unit (12) comprising:
  - an inlet $E_{12}$ connected to second outlet $S_{1b}$ of the cooking unit (1);
  - a first outlet $S_{12a}$ connected to inlet $E_6$ of the boiler (6);
  - a second outlet $S_{12b}$;
- a connection line $C_{11-2}$ between outlet $S_{1b}$ and inlet $E_{12}$;
- a connection line $C_{12-6}$ between outlet $S_{12a}$ and inlet $E_6$;
- a separation unit (17) downstream of outlet $S_{12b}$ of the hydrothermal liquefaction unit (12), comprising:
  - an inlet $E_{17}$ connected to outlet $S_{12b}$ of the hydrothermal liquefaction unit (12);
  - a first outlet $S_{17a}$;
  - a second outlet $S_{17b}$ connected to inlet $E_9$ of the causticizing unit (9);
- a connection line $C_{12-17}$ between outlet $S_{12b}$ and inlet $E_{17}$;
- a connection line $C_{17-9}$ between outlet $S_{17b}$ and inlet $E_9$.

In this device, inlet $E_{1a}$ corresponds to the inlet through which the wood is introduced into the cooking unit (1). Inlet $E_{1a}$ corresponds to the inlet through which the white liquor, recycled or not, is introduced into the cooking unit (1). In an alkaline wood treatment method, the white liquor generally comprises water, soda, and possible a sulfur source, for example, sodium sulfur. As already indicated, such an alkaline wood cooking treatment is generally performed at a temperature in the range from 150 to 180° C., and at a pressure in the range from 7 to 9 bars. According to a preferred embodiment of the invention, the alkaline treatment is carried out in the absence of sulfur.

The paper pulp (3) and the black liquor (4) are respectively discharged from the cooking unit (1) via outlet $S_{1a}$ and outlet $S_{1b}$.

For more clarity, FIG. 2 illustrates connections $C_{i-j}$ between the different units of the device according to the invention while FIG. 3 illustrates inlets $E_n$ and outlets $S_m$ of the different units of the device according to the invention.

In FIGS. 2 and 3, connection line $C_{1-12}$ connects outlet $S_{1b}$ and inlet $E_{12}$ via a branching of connection line $C_{1-5}$. Further, connection line $C_{12-6}$ connects outlet $S_{12a}$ and inlet $E_6$ via connection line $C_{5-6}$, and connection line $C_{17-9}$ connects outlet $S_{17b}$ and inlet $E_9$ via connection line $C_{6-9}$.

In FIGS. 2 and 3, the hydrothermal liquefaction unit (12) is in a bypass position, downstream of cooking unit (1) and upstream of the evaporation unit (5). It enables to treat at least part of the black liquor (4), n % by weight, while the other part of the black liquor (4), (100-n)% by weight, is concentrated in the unit (5).

In the hydrothermal liquefaction unit (12), n % by weight of the black liquor (4) are treated. This treatment provides:
- a fraction (13) corresponding to an organic phase (generally viscous), which is advantageously reinjected upstream of the boiler (6), but downstream of the evaporation unit (5),
- a fraction (14) corresponding to an aqueous phase containing organic molecules (15).

The organic molecules (15) are then separated from the aqueous phase (14) in the separator (17). Conventional separation techniques may be used, particularly filtering and/or decantation.

The aqueous phase (16) resulting from this separation is advantageously reinjected into the device, for example, upstream of the causticizing unit (9) (FIGS. 2 and 3). The aqueous phase (16) may be directly reinjected into the causticizing unit (9) or into the green liquor (8) or mixed with the residues (7) before the water (10) is introduced.

Generally, the hydrothermal liquefaction unit (12) may successively comprise a heat exchanger, a heating device, and an autoclave.

The heat exchanger enables to preheat the black liquor up to a temperature from 150 to 250° C. The heat exchanger ensures the heat transfer between the incoming fluid (black liquor (4)) and the fluid coming out of the autoclave (aqueous phase (14) and/or organic phase (13)). Thus, the incoming black liquor (4) is heated due to the fluid coming out (14 and/or 13), which is cooled.

The hydrothermal liquefaction unit heating device enables to heat the preheated black liquor to the operating temperature of the autoclave, generally between 200 and 370° C. The heating is generally electric or by combustion.

Due to the heat exchanger, which thus has a double preheating/cooling function, the temperature of the fluid (14 and/or 13) coming out of the autoclave may pass from more than 300° C. to less than 100° C., advantageously between 50 and 80° C. The temperature is selected to keep a sufficient fluidity at the outlet of the autoclave and after the passing through the heat exchanger.

According to an embodiment, only the aqueous phase (14) passes through the heat exchanger. This is especially true when the organic phase (14) is directed towards the boiler (6).

Once treated by hydrothermal liquefaction in the reactor, the black liquor (4) comprises an aqueous phase (14) and an organic phase (13) which is generally viscous.

The aqueous phase (14) is then treated in the separator (17) to isolate the organic molecules (15) that it contains. Such a separation may in particular be performed by decantation.

As already indicated, the aqueous phase (16) resulting from this separation is reinjected, directly or indirectly, into the causticizing unit (9).

Embodiments of the Invention

The following examples relate to the treatment according to the invention of different black liquors. These examples comprise:
a) the carbon balance of the hydrothermal liquefaction,
b) the sodium balance of the hydrothermal liquefaction,
c) the composition of the aqueous phase resulting from the hydrothermal liquefaction, and
d) the energy balance of the hydrothermal liquefaction.

a) Carbon Balance of the Hydrothermal Liquefaction,

The black liquor resulting from the cooking of a mixture of prehydrolyzed broadleaf tree wood has been treated by hydrothermal liquefaction according to the invention.

Before this treatment, the black liquor has the following characteristics:
- solids: 18% by weight,
- density: 1.09,
- carbon concentration: 71.8 $g_C$/L,
- sodium concentration: 26.5 $g_{Na}$/L.

The hydrothermal liquefaction of the black liquor has been performed at 280° C. at a 7 MPa pressure for a 1-hour stage (batch reactor).

97.7% of the introduced carbon has been recovered, 59.7% being in the aqueous phase and 38% in the organic phase.

b) Sodium Balance of the Hydrothermal Liquefaction

The sodium balance corresponds to the average of the sodium balances of 14 assays carried out at temperatures in the range from 250 to 310° C., for a time period in the range from 5 to 120 minutes, and at different concentrations (initial concentration, dilutions ×2 and ×4).

Generally, 97.3% of the sodium has been recovered in the aqueous phase originating from the hydrothermal liquefaction.

Accordingly, the sodium balance is not impacted by the integration of the hydrothermal liquefaction step.

c) Composition of the Aqueous Phase Resulting from the Hydrothermal Liquefaction The organic molecules generated during the hydrothermal liquefaction and present in the aqueous phase have been identified by GCMS analysis (gas phase chromatography coupled to mass spectrometry) and quantified by HPLC (high-pressure liquid chromatography) (table 1).

The molecules with the highest concentration are: phenol, catechol, guaiacol, and syringol.

TABLE 1 influence of the nature of the black liquor and of the operating conditions on the nature and the quantity of organic molecules contained in the aqueoous phase.

| Black liquor[a] | Conditions | phenol yield | catechol yield | guaiacol yield | syringol yield | Total |
|---|---|---|---|---|---|---|
| | | (wt. % of the weight of the introduced black liquor) | | | | |
| prehydrolyzed broadleaf tree wood | 250° C./5 MPa 1 hour | 0.0% | 0.2% | 1.2% | 1.4% | 2.8% |
| prehydrolyzed resinous tree wood | 250° C./5 MPa 1 hour | 0.0% | 0.1% | 2.0% | 0.0% | 2.0% |
| non-prehydrolyzed broadleaf tree wood | 250° C./5 MPa 1 hour | 0.3% | 0.2% | 0.8% | 1.1% | 2.3% |
| prehydrolyzed broadleaf tree wood | 280° C./7 MPa 1 hour | 0.1% | 1.0% | 0.7% | 0.04% | 1.8% |
| prehydrolyzed resinous tree wood | 280° C./7 MPa 1 hour | 0.1% | 0.7% | 1.0% | 0.00% | 1.7% |
| non-prehydrolyzed broadleaf tree wood | 280° C./7 MPa 1 hour | 0.4% | 0.8% | 0.4% | 0.03% | 1.6% |
| prehydrolyzed broadleaf tree wood | 310° C./10 MPa 1 hour | 0.1% | 0.6% | 0.2% | 0.00% | 0.9% |
| prehydrolyzed resinous tree wood | 310° C./10 MPa 1 hour | 0.2% | 0.4% | 0.2% | 0.00% | 0.7% |
| non-prehydrolyzed broadleaf tree wood | 310° C./10 MPa 1 hour | 0.6% | 0.5% | 0.0% | 0.00% | 1.1% |

[a]black liquors resulting from a process of soda cooking (sulfur-free), preceded or not by a prehydrolysis, from a mixture of broadleaf tree wood or of resinous tree wood Table 1 shows that the operating conditions and the nature of the black liquor may have a significant influence on the nature and on the quantity of the molecules contained in the aqueous phase. For example, temperature seems to favor the demethoxylation of guaiacol and of syringol. Accordingly, the yield of such compounds can be improved in mild conditions (250° C. vs. 310° C., for example).

d) Energy Balance of the Hydrothermal Liquefaction,

The energy balance has been obtained in the case of a broadleaf wood soda black liquor prehydrolized at 280° C., 7 MPa, and for a 1-hour stage.

Such an energy balance corresponds to the treatment of 1 kg of black liquor:
- approximately 1,000 kJ are necessary to heat 1 kg of black liquor from 20° C. to 280° C. (considering that the specific heat of the black liquor is equal to that of water);
- the organic (biocrude) phase originating from the hydrothermal liquefaction of the black liquor contains 40% of humidity and may be directly submitted to a combustion, enabling to recover 1,950 kJ;
- the evaporation of the residual water of the organic phase requires 60 kJ.

Thus, the combustion of the organic phase resulting from the hydrothermal liquefaction enables to recover a larger amount of energy than that spent during the hydrothermal liquefaction.

The invention claimed is:

1. A paper pulp preparation device comprising:
a unit for cooking wood components, in which the wood components are separated into two fractions:
  paper pulp, and
  black liquor;
  the unit for cooking the wood comprising a first inlet $E_{1a}$ for introducing wood, a second inlet $E_{1b}$ for charging white liquor, a first outlet $S_{1a}$, for discharging the paper pulp, and a second outlet $S_{1b}$ for discharging the black liquor;
a hydrothermal liquefaction unit allowing the treatment of at least a part of the black liquor, and comprising:
  an inlet $E_{12}$ for the black liquor connected to second outlet $S_{1b}$ of the cooking unit;
  a first outlet $S_{12a}$ for an organic phase resulting from the hydrothermal liquefaction;

a second outlet $S_{12b}$ for an aqueous phase resulting from the hydrothermal liquefaction and containing organic molecules;

a connection line $C_{1-12}$ between outlet $S_{1b}$ and inlet $E_{12}$;

a separation unit downstream of outlet $S_{12b}$ of the hydrothermal liquefaction unit, the separation unit allowing the separation of organic molecules contained in the aqueous phase resulting from the hydrothermal liquefaction, and comprising:

an inlet $E_{17}$ for the aqueous phase resulting from the hydrothermal liquefaction, connected to outlet $S_{12b}$ of the hydrothermal liquefaction unit;

a first outlet $S_{17a}$ of organic molecules;

a second outlet $S_{17b}$ of aqueous phase;

a connection line $C_{12-17}$ between outlet $S_{12b}$ and inlet $E_{17}$;

a causticizing unit comprising an inlet $E_9$ for the aqueous phase originating from outlet $S_{17b}$ and an outlet $S_9$ for the white liquor, outlet $S_9$ being connected to second inlet $E_{1b}$ of the cooking unit;

a connection line $C_{17-9}$ between outlet $S_{17b}$ and inlet $E_9$;

a connection line $C_{9-1}$ between outlet $S_9$ and inlet $E_{1b}$;

an evaporation unit downstream of outlet $S_{1b}$ of the cooking unit, the evaporation unit allowing to concentrate the black liquor, and comprising an inlet $E_5$ for the black liquor resulting from the cooking unit and an outlet $S_5$ of the black liquor concentrated in the evaporation unit;

wherein outlet $S_{1b}$ splits into two separate connection lines $C_{1-12}$ and $C_{1-5}$;

connection line $C_{1-5}$ being between outlet $S_{1b}$ and inlet $E_5$;

a boiler downstream of outlet $S_5$ of the evaporation unit, the boiler allowing to burn the concentrated black liquor, and comprising an inlet $E_6$ for the concentrated black liquor and an outlet $S_6$ for residues of the combustion;

a connection line $C_{5-6}$ between outlet $S_5$ and inlet $E_6$;

the causticizing unit downstream of outlet $S_6$ of the boiler, comprising the inlet $E_9$ for the aqueous phase originating from outlet S17b and a green liquor containing the residues of the combustion and an outlet $S_9$ for a white liquor, outlet $S_9$ being connected to second inlet $E_{1b}$ of the cooking unit;

a connection line $C_{6-9}$ between outlet $S_6$ and inlet $E_9$;

a connection line $C_{12-6}$ between outlet $S_{12a}$ and inlet $E_6$.

2. The paper pulp preparation device of claim 1, wherein connection line $C_{12-6}$ connects outlet $S_{12a}$ and inlet $E_6$ via connection line $C_{5-6}$.

3. The device of claim 1, wherein connection line $C_{17-9}$ connects output $S_{17b}$ and input $E_9$ via connection line $C_{6-9}$.

4. The device of claim 1, wherein the hydrothermal liquefaction unit successively comprises a heat exchanger, a heating device, and an autoclave.

5. A method of preparing paper pulp from wood, comprising the steps of:
cooking the wood;
obtaining paper pulp and a black liquor;
treating at least part of the black liquor by hydrothermal liquefaction;
obtaining an aqueous phase containing organic molecules and an organic phase;
treating the aqueous phase resulting from the hydrothermal liquefaction, by separation of the organic molecules,
wherein the method is performed by the device of claim 1.

6. A method of preparing paper pulp from wood, comprising the steps of:
cooking the wood;
obtaining paper pulp and a black liquor;
treating at least part of the black liquor by hydrothermal liquefaction;
obtaining an aqueous phase containing organic molecules and an organic phase;
treating the aqueous phase resulting from the hydrothermal liquefaction, by separation of the organic molecules,
wherein the method is performed by the device of claim 2.

7. A method of preparing paper pulp from wood, comprising the steps of:
cooking the wood;
obtaining paper pulp and a black liquor;
treating at least part of the black liquor by hydrothermal liquefaction;
obtaining an aqueous phase containing organic molecules and an organic phase;
treating the aqueous phase resulting from the hydrothermal liquefaction, by separation of the organic molecules,
wherein the method is performed by the device of claim 3.

8. A method of preparing paper pulp from wood, comprising the steps of:
cooking the wood;
obtaining paper pulp and a black liquor;
treating at least part of the black liquor by hydrothermal liquefaction;
obtaining an aqueous phase containing organic molecules and an organic phase;
treating the aqueous phase resulting from the hydrothermal liquefaction, by separation of the organic molecules,
wherein the method is performed by the device of claim 4.

* * * * *